United States Patent

Yanagisawa

[11] Patent Number: 5,757,581
[45] Date of Patent: May 26, 1998

[54] MAGNETIC DISC DEVICE FOR LUBRICATING A ROTATING DISC

[75] Inventor: Masahiro Yanagisawa, Tokyo, Japan

[73] Assignee: NEC Corporation, Tokyo, Japan

[21] Appl. No.: 777,450

[22] Filed: Dec. 30, 1996

[30] Foreign Application Priority Data

Dec. 28, 1995 [JP] Japan ................. 7-342148

[51] Int. Cl.$^6$ ............................... G11B 33/14
[52] U.S. Cl. ............................... 360/97.02
[58] Field of Search ............... 360/97.01–97.02

[56] References Cited

U.S. PATENT DOCUMENTS

| | | | |
|---|---|---|---|
| 3,005,675 | 10/1961 | Ledin et al. | 360/102 |
| 4,626,941 | 12/1986 | Sawada et al. | 360/98.02 |
| 4,633,351 | 12/1986 | Bardos et al. | 360/102 |
| 4,789,913 | 12/1988 | Gregory et al. | 360/97.02 |
| 5,193,046 | 3/1993 | Lemke | 360/97.02 |
| 5,202,803 | 4/1993 | Albrecht | 360/97.02 |
| 5,396,383 | 3/1995 | Gregory et al. | 360/97.02 |
| 5,559,650 | 9/1996 | Repphun et al. | 360/97.02 |

FOREIGN PATENT DOCUMENTS 63-308775  12/1988  Japan .
2-50376    2/1990   Japan .

OTHER PUBLICATIONS

H. Hamilton, "Contact Recording on Perpendicular Rigid Media", Journal of the Magnetic Society of Japan, vol. 15, Supplement, No. S2, 1991.

Primary Examiner—John H. Wolff
Attorney, Agent, or Firm—Foley & Lardner

[57] ABSTRACT

In a casing 4 formed into a cylindrical container, there are magnetic disc media 6 installed rotatably at a high rotational speed, magnetic heads 5 in contact with recording surfaces of the magnetic disc media 6, fibrous pads 11 projecting radially inwardly from a circumferential wall 2 of the casing 4, impregnated with lubricant and disposed in contact with the recording surfaces of the magnetic disc media, and a porous material 12 disposed in the inner surface of the circumferential wall 2 and in contact with the fibrous pads 11. The lubricant L that has flown from the recording surfaces to the peripheral portion is absorbed to the porous material 12 due to a centrifugal force generated by the rotation of the magnetic disc media 6 moves to the fibrous pads 11 by a capillary action to be fed again to the recording surfaces.

6 Claims, 2 Drawing Sheets

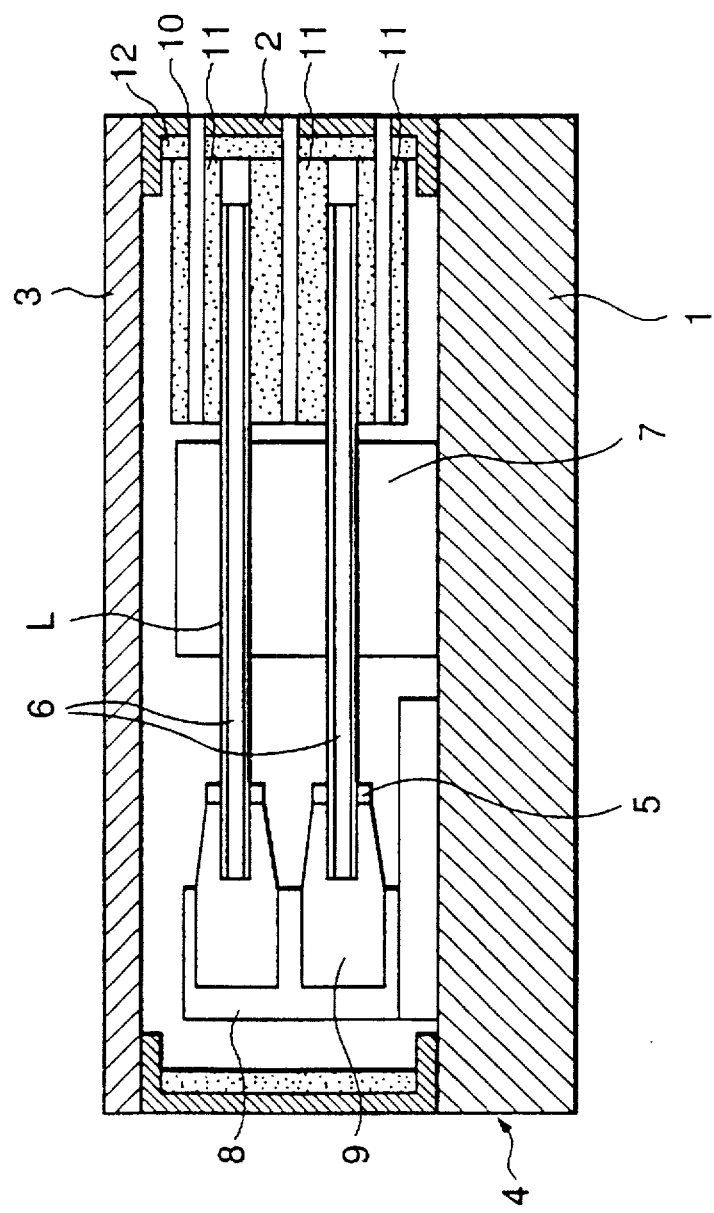

MAGNETIC DISC DEVICE FOR LUBRICATING A ROTATING DISC

BACKGROUND OF THE INVENTION

1. Field of the Invention

The present invention relates to a magnetic disc device in which a magnetic head reads/writes information to a magnetic recording medium, and more particularly to a mechanism for feeding lubricant to a surface of a magnetic recording medium.

2. Description of the Related Art

Recently, a density of recording has been increased in a technical field of an information storage file. In a magnetic disc device, one of the important tasks for attaining the higher information recording density is that a space between a magnetic head for reading/writing information and a recording medium which retains the information, i.e., a spacing therebetween, should be decreased as much as possible.

U.S. Pat. No. 4,633,351 discloses a magnetic disc which uses a liquid bearing instead of a pneumatic bearing in order to reduce the spacing. Also, Journal of the Magnetic Society of Japan by H. Hamilton (Vol. 15, Supplement No. S2 (1991), Pages 483-490) discloses a contact type magnetic disc device in which a magnetic head slider and a magnetic slider support mechanism are made small in size and light in weight. Furthermore, there is another attempt to utilize a pressure of a liquid lubricant and a surface tension of a liquid lubricant layer provided on a surface of a magnetic disc medium to thereby keep the magnetic head and the magnetic disc medium separate from each other to thereby prevent a damage of the head and save the spacing therebetween.

The contact type magnetic disc device is superior to the floating head type magnetic disc device in that the magnetic head is brought into contact with the magnetic disc medium to thereby make the spacing zero.

However, in the contact type magnetic disc device, since a frictional wear between the magnetic head and the magnetic disc medium surface is generated by the friction therebetween, a service life of the device per se would be shorter than that of the floating head type magnetic disc device. It is possible to suppress the generation of wear to some extent by forming the liquid lubricant layer on the surface of the magnetic disc medium. However, by simply providing the liquid lubricant layer on the surface of the magnetic disc, the liquid lubricant is dispersed to the peripheral portion of the disc by the centrifugal force during the high speed rotation of the magnetic disc and the lubricant on the surface of the magnetic disc is likely to be dried up. Accordingly, it is difficult to maintain the suitable liquid lubricant layer for a long period of time.

With respect to a technology to solve such a problem, Japanese Laid-Open Patent Application Nos. Sho 63-308775, and Hei 2-50376 disclose a magnetic disc device having a means for feeding the liquid lubricant. However, in such a magnetic disc device, since the means for feeding the lubricant is provided directly on the magnetic disc medium, it is necessary to apply a machine working directly to the magnetic disc medium, resulting in complication in manufacture. Also, since the liquid lubricant is dispersed to the peripheral portion and consumed gradually by the high speed rotation of the magnetic disc medium, the liquid lubricant is dried up for a long period of time. This is also the case in the floating head type magnetic disc device in which the lubricant is coated on the surface of the magnetic disc surface.

SUMMARY OF THE INVENTION

A primary object of the invention is to provide a magnetic disc device in which it is possible to prevent a exhaustion of liquid lubricant on surfaces of magnetic disc media for a long period of time without effecting a direct machine work to the magnetic disc media.

The magnetic disc device according to the present invention is characterized by comprising a lubricant feeding means for feeding the lubricant to the recording surfaces of the magnetic disc media, and a lubricant collecting means for collecting the lubricant that has flown from the recording surfaces to the peripheral portion and for returning the collected lubricant to the lubricant feeding means.

The feeding means comprises a fibrous pad arranged to contact or be in the vicinity of the recording surface of the magnetic disc medium and impregnated with liquid lubricant. The collecting means comprises a porous material disposed around the magnetic disc medium for receiving the lubricant that has flown from the recording surface of the magnetic disc medium to the peripheral portion by a centrifugal force, a part of said porous material being in contact with said feeding means.

In one preferable embodiment, a lubricant collecting means is a casing formed into a cylindrical container. In the casing, at least one magnetic disc medium which may be rotatable at a high speed is installed. Magnetic heads are brought into contact with the recording surfaces formed at least one side of the magnetic disc medium through the lubricant. Also, the fibrous pads project radially inwardly from a part of the circumferential wall of the casing.

BRIEF DESCRIPTION OF THE DRAWINGS

In the accompanying drawings:

FIG. 2 is a longitudinal sectional view showing the magnetic disc device shown in FIG. 1.

DESCRIPTION OF THE PREFERRED EMBODIMENT

Figure 1:
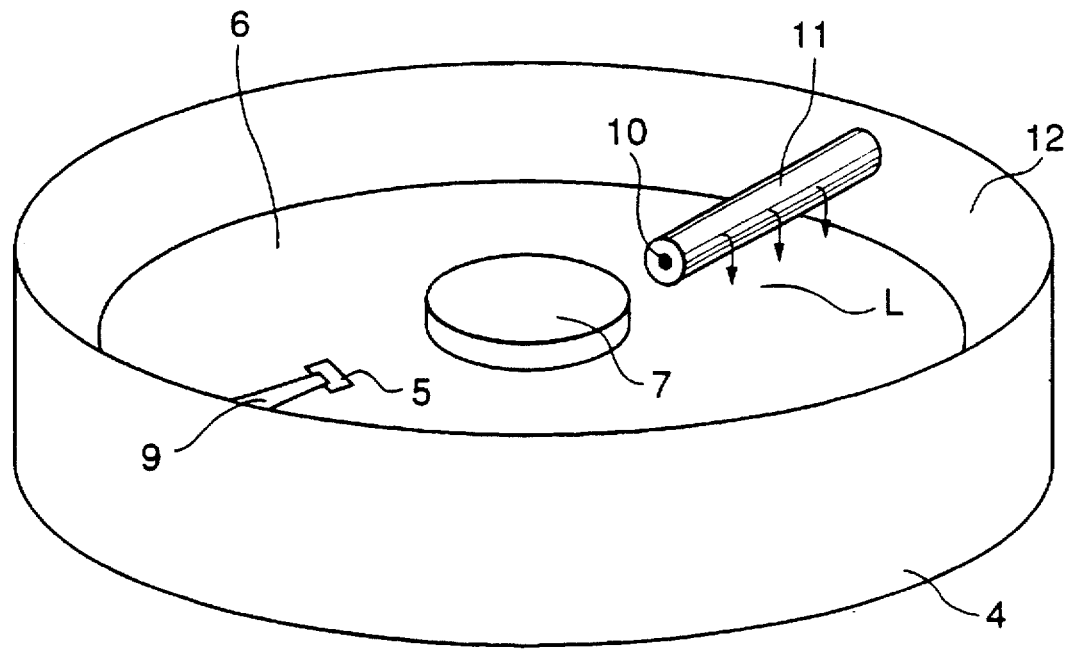
FIG. 1 is a perspective view showing a magnetic disc device according to the present invention.

An embodiment of the invention will now be described with reference to FIG. 1. FIG. 1 is a view showing an outer appearance of a magnetic disc device according to the present invention. FIG. 2 is a longitudinal sectional view thereof.

In the embodiment shown in FIGS. 1 and 2, a casing 4 is formed by a circular base 1, a circumferential wall 2 formed upright and an associated cover 3. A disc chamber is defined in the interior of the casing 4. Magnetic heads 5 and magnetic disc media 6 are installed in the disc chamber. The magnetic disc media 6 are supported to a rotary drive mechanism 7 at their centers and drivingly rotated at a high rotational speed.

Incidentally, in FIG. 2, two magnetic disc media 6 are installed in the casing 4, and a top surface and a bottom surface of each magnetic disc medium 6 are formed into recording surfaces. The magnetic heads 5 are brought into contact with these recording surfaces to thereby record information on each recording surface. Each magnetic head 5 is fixed to a distal end of an elastic support member 9 supported and fixed at its proximal end to a support portion 8, and is brought into contact with the surface of the magnetic disc medium 6 by the elastic force of the support member 9.

At a part of the circumferential surface of the circumferential wall 2, i.e., the circumferential surface of the circumferential wall 2 in diametrically opposite radial direction to the magnetic heads 5, support rods 10 extend from the circumferential wall 2 toward the centers of the magnetic disc media 6 so as to approach the recording surfaces of the recording disc media 6. Fibrous pads 11 having a thin cylindrical form and impregnated with liquid lubricant are fitted around the support rods 10. The surface of the fibrous pads 11 are in contact with the recording surfaces of the recording disc media 6. A porous material 12 having a predetermined thickness is attached to the entire circumference of the inner surface of the circumferential wall 2. The inner surface of the porous material 12 is in contact with the fibrous pads 11.

Incidentally, it is preferable that the above-described fibrous pads 11 be made in a dimension including the recording surfaces of the magnetic disc media 6, i.e., in a radial length of the recording surfaces on which the magnetic heads 5 contact.

According to this structure, the liquid lubricant L is impregnated into the fibrous pads 11 in advance and the surfaces are in contact with or very close to the recording surfaces of the magnetic disc media 6. Accordingly, the impregnated liquid lubricant L forms thin layers on the recording surfaces during the rotation of the magnetic disc media 6. The layers become the liquid lubricant layers. The liquid lubricant layers are interposed between the surfaces of the magnetic disc media 6 and the magnetic heads 5 to thereby reduce the friction therebetween to suppress the wear thereof.

Figure 3:
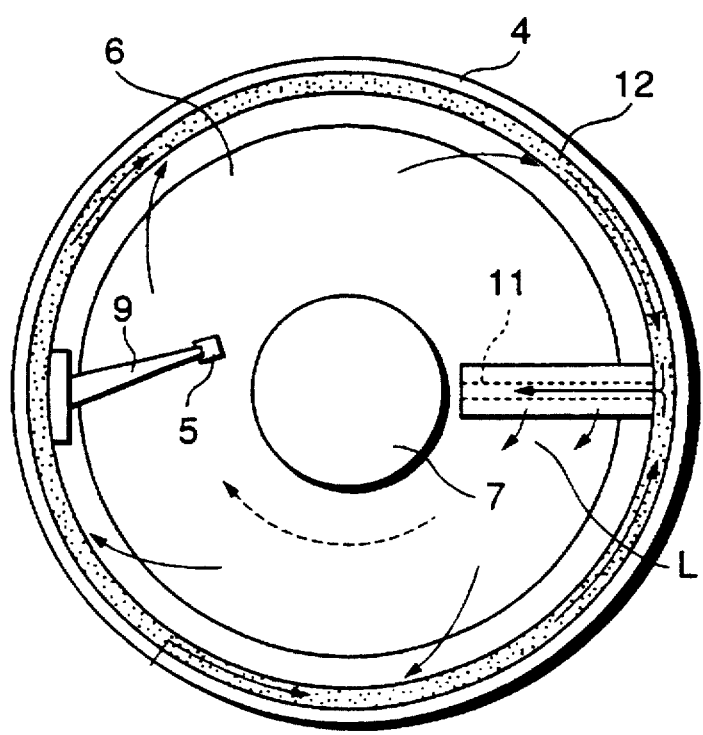
FIG. 3 is a schematic plan view illustrating the movement of lubricant.

When the magnetic disc media 6 are rotated at a high speed in writing/reading information, as shown schematically in FIG. 3, the liquid lubricant L fed from the fibrous pads 11 flies radially outwardly from the surfaces of the magnetic disc media 6 in the radially outward direction by the centrifugal force. However, the liquid lubricant L has flown to stick to the porous material 12 arranged on the circumferential wall 2 surrounding the peripheral portion so that the lubricant L is captured thereat. The captured lubricant L moves in the porous material 12 by capillary action and permeates to the fibrous pads 11 which contacts with the porous material 12. The liquid lubricant which has permeated to the fibrous pads 11 are again fed to the surfaces of the magnetic disc media 6. Thus, the liquid lubricant L is recirculated among the fibrous pads 11, the surfaces of the magnetic disc media 6 and the porous material 12. As a result, the wear is suppressed. The lubrication for a long period of time is possible.

In this case, it is preferable that fibrous material such as felt, polyester, nylon, cotton or the like be used as the fibrous pads 11 in order not to damage the recording surfaces of the magnetic disc media 6. Also, since the porous material 12 does not have to be soft, it is possible to use porous ceramics or porous plastic in addition to the fibers such as fibrous pads.

In the experiments conducted by the inventors, the cylindrical fibrous pads made of felt, having a diameter of 4 mm and impregnated with perfluoropolyether oil were brought into contact with the surfaces of the magnetic disc media having a diameter of 3.5 inches and coated with lubricant made of perfluoropolyether oil at a thickness of 10 nm. The fibrous pads were mounted around the support rods made of stainless steel and having a diameter of 1 mm. The porous material made of felt and having a thickness of 4 mm was attached to the inner surface of the circumferential wall and was brought into contact with the outer end portions of the above-described fibrous pads. In this case, perfluoropolyether oil was impregnated in advance in the porous material.

For a comparison example, a magnetic disc device was prepared, wherein there were provided neither fibrous pads 11 nor porous material 12 containing the lubricant.

By using these magnetic disc devices, the magnetic disc media were rotated at 4,500 rpm. Then, the thickness of the lubricant on the surfaces of the magnetic disc media after 2,000 hours was measured.

As a result, with respect to the magnetic disc media for the magnetic disc device according to the present invention, the thickness of the layer was kept unchanged at 10 nm. In contrast, in the magnetic disc media for the magnetic disc device according to the comparison example, the thickness of the film was reduced to one half. Also, when the recording surfaces of the magnetic disc media on both cases were observed after the experiment, there were no damage of the magnetic disc media according to the present invention at all, whereas the damage was observed on the surfaces in the comparison example.

It was confirmed from the results that the magnetic disc device according to the present invention was superior in reliability to the magnetic disc device according to the comparison example.

Needless to say, the material and the shape of lubricant, porous material, fibrous pads and the support rods are not limited to those shown in the embodiment but various modifications are possible. In the foregoing description, the present invention has been explained in detail with respect to the case of the magnetic disc device for writing/recording information, while the magnetic heads are in contact with the surfaces of the magnetic disc media. It is obvious for those skilled in the art that the present invention may be applied to the magnetic head floating type magnetic disc device without any substantial change.

As has been described above, according to the present invention, since the lubricant that has flown from the recording surfaces may be collected and again fed to the recording surfaces, it is possible to prevent the exhaustion of the lubricant on the recording surfaces of the magnetic disc media for a long period of time. Also, since it is possible to feed the lubricant to the recording surfaces without providing the lubricant feeding means directly to the magnetic disc media, it is unnecessary to effect any direct machine work to the magnetic disc media. Also, the respective shapes of the porous material 12, the circumferential wall 2, the fibrous pads 11 and the support rods 10 are simple so that the step and labor for manufacturing these components are reduced.

Modifications of the invention herein discloses will occur to a person skilled in the art and all such modifications are deemed to be within the scope of the invention as defined by the appended claims.

What is claimed is:

1. A magnetic disc device comprising:
   at least one magnetic disc medium having at least one recording surface;
   a casing dimensioned to receive said at least one magnetic disc medium:
   at least one magnetic head mounted to said casing to write/read information to said at least one recording surface of said at least one magnetic disc medium;
   feeding means for feeding lubricant applied to said feeding means to said at least one recording surface of said at least one magnetic disc medium; and collecting means for collecting lubricant from a peripheral portion of said at least one recording surface of said at least one magnetic disc medium and for returning the collected lubricant to said feeding means.

2. The magnetic disc device according to claim 1, wherein said feeding means comprises a lubricant-impregnated fibrous pad that extends radially inwardly from said casing to lubricate said at least one recording surface of said at least one magnetic disc medium.

3. The magnetic disc device according to claim 2, wherein said casing has an inner surface, and said collecting means comprises a porous material disposed on said inner surface of said casing to receive lubricant from the peripheral portion of said at least one recording surface of said at least one magnetic disc medium, said porous material being in contact with said feeding means.

4. A magnetic disc device according to claim 1, wherein said at least one magnetic head contacts said at least one recording surface of said at least one magnetic disc medium.

5. A magnetic disc device according to claim 1, wherein said at least one magnetic head is spaced from said at least one recording surface of said at least one magnetic disc medium.

6. A magnetic disc device comprising:

at least one magnetic disc medium having at least one recording surface;

a casing dimensioned to receive said at least one magnetic disc medium and having an inner wall;

at least one magnetic head mounted in said casing to write/read information to said at least one recording surface of said at least one magnetic disc medium;

a lubricant-impregnated fibrous pad projecting from said inner wall of said casing, said fibrous pad being disposed in contact with said at least one recording surface of said at least one magnetic disc medium; and a porous material disposed on said inner wall and being in contact with said fibrous pad.

* * * * *